United States Patent
Morejon et al.

(10) Patent No.: US 7,261,453 B2
(45) Date of Patent: Aug. 28, 2007

(54) LED POLARIZING OPTICS FOR COLOR ILLUMINATION SYSTEM AND METHOD OF USING SAME

(76) Inventors: Israel J. Morejon, 3302 W. Ellicott St., Tampa, FL (US) 33614; Jinhui Zhai, 2664 McMullen Booth Rd. #617, Clearwater, FL (US) 33761; Haizhang Li, 666 Oak Chase Dr., Orlando, FL (US) 32826; Robert J. Pantalone, 3182 Shoreline Dr., Clearwater, FL (US) 33760

( * ) Notice: Subject to any disclaimer, the term of this patent is extended or adjusted under 35 U.S.C. 154(b) by 66 days.

(21) Appl. No.: 11/158,805

(22) Filed: Jun. 22, 2005

(65) Prior Publication Data

US 2006/0164857 A1    Jul. 27, 2006

Related U.S. Application Data

(60) Provisional application No. 60/646,775, filed on Jan. 25, 2005, provisional application No. 60/646,777, filed on Jan. 25, 2005, provisional application No. 60/646,778, filed on Jan. 25, 2005.

(51) Int. Cl.
*F21V 7/04* (2006.01)
(52) U.S. Cl. ............... 362/555; 362/19; 362/800; 353/31; 353/33; 353/94
(58) Field of Classification Search ............ 362/19, 362/555, 800; 353/31, 33, 94
See application file for complete search history.

(56) References Cited

U.S. PATENT DOCUMENTS

| | | | |
|---|---|---|---|
| 5,751,384 | A | 5/1998 | Sharp |
| 6,092,901 | A | 7/2000 | Hashizume et al. |
| 6,220,714 | B1 | 4/2001 | Eguchi |
| 6,224,216 | B1 | 5/2001 | Parker et al. |
| 6,411,438 | B1 | 6/2002 | Itoh et al. |
| 6,644,814 | B2 | 11/2003 | Ogawa et al. |
| 6,739,726 | B2 | 5/2004 | Li |
| 6,776,489 | B2 | 8/2004 | Suzuki |
| 7,072,096 | B2 * | 7/2006 | Holman et al. ............ 359/298 |
| 2004/0090763 | A1 | 5/2004 | Li et al. |
| 2004/0184005 | A1 * | 9/2004 | Roth ........................ 353/20 |

* cited by examiner

*Primary Examiner*—Renee Luebke
*Assistant Examiner*—Jessica L McMillan
(74) *Attorney, Agent, or Firm*—Price Heneveld Cooper Dewitt & Litton LLP

(57) ABSTRACT

A light illumination apparatus and method for providing a light source includes light emitting diodes (LEDs) (101, 102, 103) and optical waveguides (104, 105, 106) associated with the light sources for guiding the light to the nonpolarized dichroic combiner (107). The dichroic combiner (107) combines the light from the wave guides into a single light source. Lenses (207, 208, 209) may also be used to focus light from the waveguides to the dichroic combiner (107). The invention provides an efficient approach to provide a single source of light using LEDs.

35 Claims, 18 Drawing Sheets

LED POLARIZING OPTICS FOR COLOR ILLUMINATION SYSTEM AND METHOD OF USING SAME

CROSS-REFERENCE TO RELATED APPLICATIONS

Priority for this non-provisional application is based on provisional patent application entitled LED Polarizing Optics for Color illumination System, Ser. No. 60/646,775, filed Jan. 25, 2005; LED Color illumination Apparatus for Polarized Light Projection System, Ser. No. 60/646,777, filed Jan. 25, 2005; and RGB LED Illumination Apparatus for DLP Projection Applications, Ser. No. 60/646,778, filed Jan. 25, 2005, all owned by Jabil Circuit, Inc.

FIELD OF THE INVENTION

This invention generally relates to a polarized light illumination apparatus to provide illumination for a microdisplay projection-type display system.

BACKGROUND OF THE INVENTION

In recent years, digital projection systems using spatial light valve modulators, such as a digital micromirror device (hereafter "DMD"), transmissive liquid crystal display (hereafter "LCD") and reflective liquid crystal on silicon (hereafter "LCoS") have been receiving much attention as they provide a high standard of display performance. These displays offer advantages such as high resolution, a wide color gamut, high brightness and a high contrast ratio.

Color projection systems of the type based on either LCD or LCoS technology require linearly polarized light as the illumination light source; however, DMD systems do not require the use of polarized light. LCD and LCoS devices depend on either the polarization rotation effect or the birefringent effect of the liquid crystal to generate light. The light emitted from the light source must be converted into polarized light for illuminating an LCD or LCoS spatial light modulator. Those skilled in the art will recognize that the optical system contained within a commercial LCD or LCoS projector typically combines a fly's-eye lens array with a polarizing beam splitter array. Examples of such an arrangement can be found in U.S. Pat. Nos. 6,411,438, 6,776,489, 6,739,726 and 6,092,901 which are all incorporated by reference herein. Two drawbacks to using the fly's-eye type of optical system are that it is bulky and expensive to manufacture.

Most projection systems use short arc gaseous white lamps such as ultra-high pressure mercury, xenon or the like that can achieve a relatively high etendue efficiency required for panel illumination. Etendue refers specifically to the geometric capability of an optical system to transmit radiation such as its throughput. Currently, only a limited number of manufacturers are capable of producing high-quality short arc lamps. The typical operational lifetime of these types of lamps is about 2000 to 6000 hours. Moreover, there is a significant amount of ultraviolet (UV) and infrared (IR) light emitted from this type of lamp.

The unfiltered UV light reduces the lifetime of both the optical components and microdisplay panel within the system, while IR light requires additional cooling devices to maintain a desired operating temperature.

Significant efforts have been dedicated towards moving away from short arc lamps through the utilization of light emitting diodes (LED) in projection illumination systems. One apparent advantage is that LEDs using three primary colors can produce a wider color gamut than conventional white lamps. In addition, LEDs have a high light efficiency, i.e., the ratio of luminous output to the electrical power required, since all spectra of the red, green and blue light from LEDs can be utilized in a visual system. U.S. Pat. No. 6,224,216, which is incorporated by reference herein, describes a triple path projector employing three single-color LED arrays. The LEDs emit light propagating along separate paths through fiber bundles to respective waveguide integrators and thereafter to respective display devices. A problem exists in this type of system in view of the coupling between LEDs and fibers. In practice, due to coupling and transmission loss, it is difficult to efficiently couple light emitting from the LED arrays to the corresponding fiber bundles and waveguides.

Similarly, U.S. Pat. No. 6,220,714 discloses a projection system using LEDs for illumination, where light beams emitting from red, green and blue LED arrays are collimated by condenser lenses which pass through fly's-eye type of integrators for illuminating a single panel. Based on the geometry of the fly's-eye type integrator, only the surface area of light emitting region within a certain field of view can be effectively collected for illuminating a panel. A similar system can be found in U.S. Pat. No. 6,644,814, which describes an LED-illumination-type DMD projector with one panel. Generally, a common problem within these prior art systems is that some light from LEDs cannot enter the corresponding lens of the first and second fly's-eye lenses due to aberration and aperture limitation of the lens array. Therefore, a portion of the illumination light will fall outside of the panel area, resulting in low light efficiency and low contrast.

Thus, the need exists to provide a light illumination device for digital light processing (DLP) projection systems or the like which utilize non-polarized light with high efficiency and required brightness without the aforementioned problems and complicated or expensive components.

BRIEF DESCRIPTION OF DRAWINGS

The above and other features and advantages of the present invention will be further understood from the following description of the preferred embodiments thereof, taken in conjunction with the accompanying drawings.

DETAILED DESCRIPTION OF THE INVENTION

The present description is directed in particular to elements forming part of, or cooperating more directly with, the apparatus in accordance with the invention.

Figure 1:
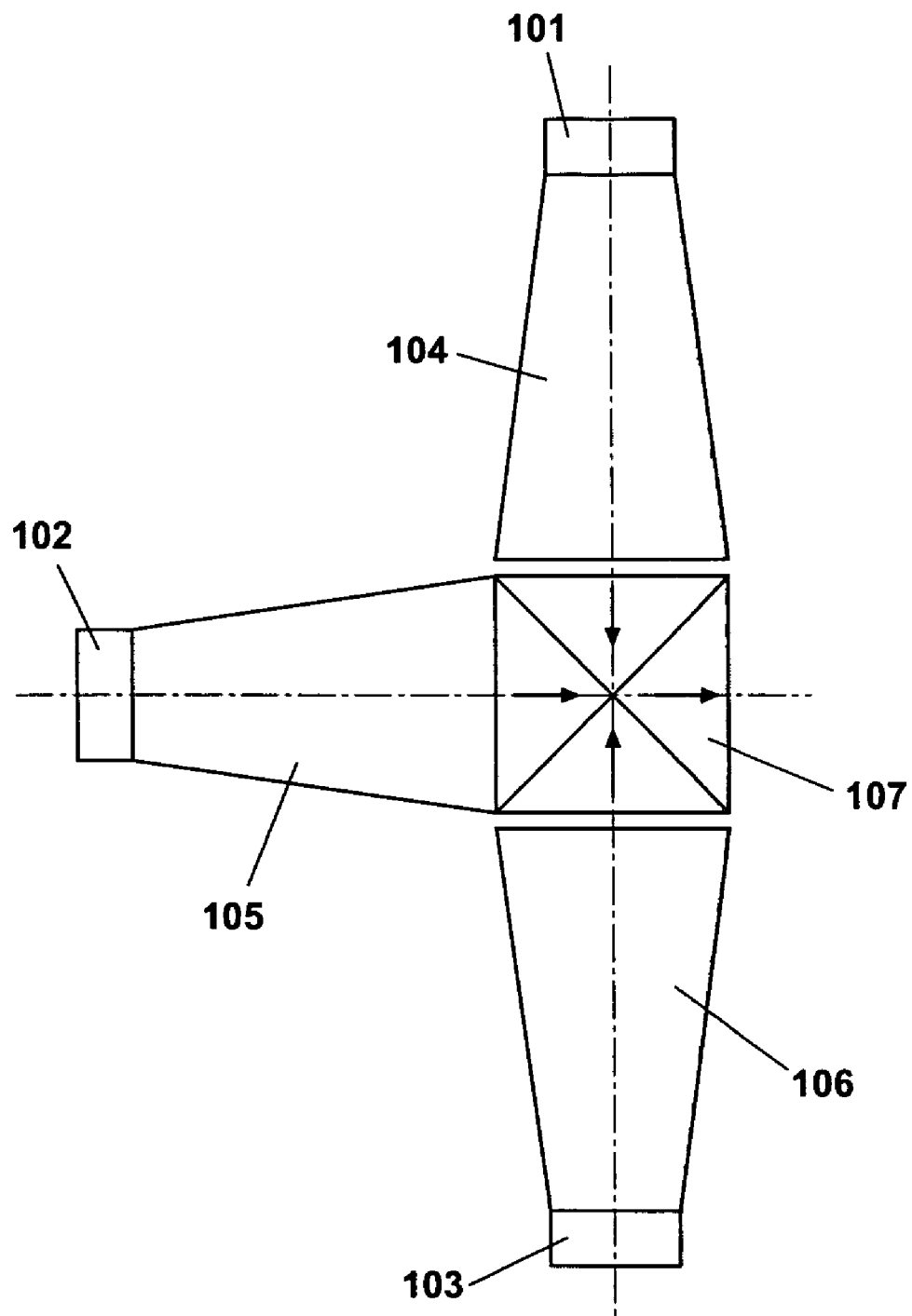
FIG. 1 is a block diagram illustrating an LED color illumination assembly that includes three LEDs, three waveguides and a non-polarized cross-dichroic combiner in accordance with one embodiment of the invention.

Turning now to the figures, FIG. 1 is a block diagram depicting a polarized light illumination assembly in accordance with the present invention which includes a red LED 101, a green LED 102, a blue LED 103, three tapered waveguides 104, 105, 106, and a cross-dichroic combiner 107. The light beams emitting from the red LED 101, green LED 102 and blue LED 103 are homogenized and guided by tapered waveguides 104, 105 and 106, respectively. The light exit faces of the waveguides are connected to three entrance surfaces of the non-polarized cross-dichroic combiner 107. The green light transmits through the dichroic combiner 107 while the red and blue light beams are reflected from the dichroic combiner 107. As will be evident to those skilled in the art, the tapered waveguides 104, 105 and 106 are structures that "guide" the respective RGB light waves by tapering the beam to travel along a certain desired path to the dichroic combiner 107. In this embodiment, the design of the tapered waveguide will act to guide cone light from a 60-degree diverge LED light to the input non-polarizing dichroic combiner.

With regard to the dichroic combiner which is sometimes referred to as an "x cube", this device consists of two dichroic coating filters that combine or separate beams of three different colors, namely, red (r), green (g), and blue (b). One dichroic coating filter reflects blue light by transmitting green and red lights while another dichroic coating filter reflects red light by transmitting green and blue lights, where the RGB light from three input directions can be combined into one output light path, the dichroic combiner can be either a cross type, V-type or similar configuration. The non-polarizing dichroic combiner can be used to combine both P and S polarization input light at high efficiency.

In the invention, a tapered hollow pipe or a tapered integrator rod is used as a waveguide to achieve multifunctional objectives. A novel tapered waveguide is then used to collimate, homogenize and shape the light beam. The tapered waveguide can reduce the angle of the input cone at the tapered ratio due to etendue preservation which is the product of the illuminated area and the illumination solid angle at the output face of the waveguide is equal to the etendue at the input face of the waveguide.

As shown in FIG. 1, the area of the output face of the waveguides 104, 105, 106 is greater than that of its input face, thus the cone angle of the output beam is smaller than that of the input beam. Consequently, a collimation function is achieved. The second function of the tapered waveguides 104, 105, 106 is that of a light homogenizer that works to change the spatially, non-uniform distributed light on the input face of the waveguide to output light that has essentially uniform intensity. The third function of waveguides 104, 105, 106 is beam shaping where the aspect ratio of the output surface of the tapered waveguide will be different from that of the input surface. This is essential in the invention since the shape of the light source must be proportional to that of the panel that is illuminated. Compared with most collimation lenses or lens array based illumination systems, a tapered waveguide based system is highly efficient, relatively compact in size, simple in structure, and inexpensive in manufacturing cost. The embodiment shown in FIG. 1 shows an intentional gap between the red waveguide 104 and the upper side surface of the non-polarized cross-dichroic combiner 107 as well as between the blue waveguide 106 and lower side surface of the non-polarized dichroic combiner 107. Thus, light that exits from the green waveguide 105 reflects internally on both side surfaces of the dichroic combiner 107 and green light bleeding into the red and blue waveguides 105, 106 can be prevented.

Figure 2:
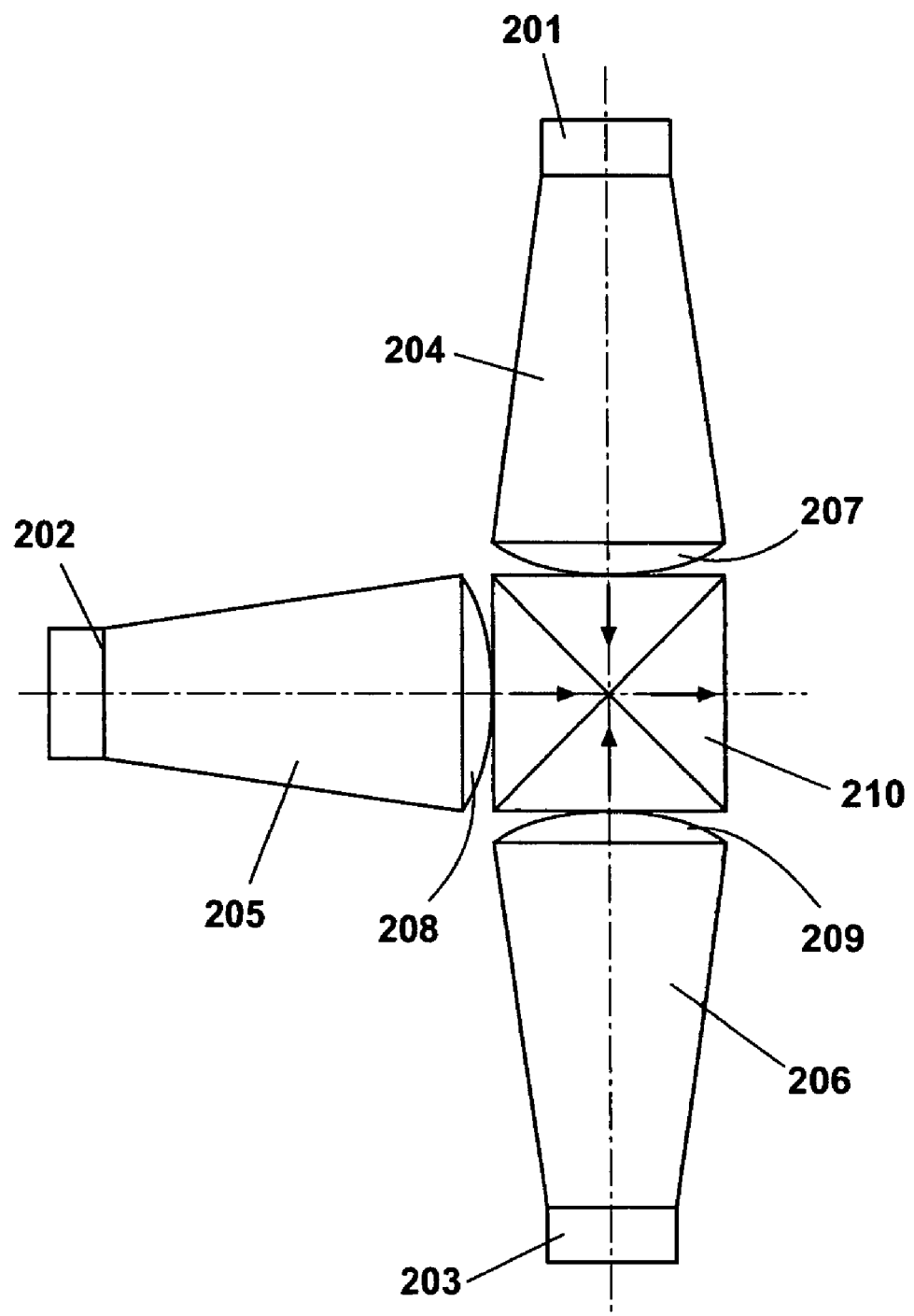
FIG. 2 is a block diagram illustrating an LED color illumination assembly with lenses added to exit faces of the waveguides as shown in FIG. 1.

FIG. 2 shows an alternative embodiment of the illumination assembly shown in FIG. 1 where lenses 207, 208, 209 can be attached to the exit surfaces of the respective waveguides, allowing the light beams exiting from three waveguides to become further converged. The light emitting from red LED 201, green LED 202 and blue LED 203 are homogenized and guided by tapered waveguides 204, 205 and 206, respectively. The light beams exiting from three waveguides 204, 205 and 206 are further converged by three lenses 207, 208 and 209 and thereafter enter the three entrance surfaces of the non-polarized cross-dichroic combiner 207. If the waveguide 204, 205, 206 is manufactured of solid glass rod, the lens and corresponding rod can be integrated into a one-piece optical component. Moreover, lenses may be added on top of the LEDs at the front end of the tapered waveguides to further collimate the LED light.

Figure 3:
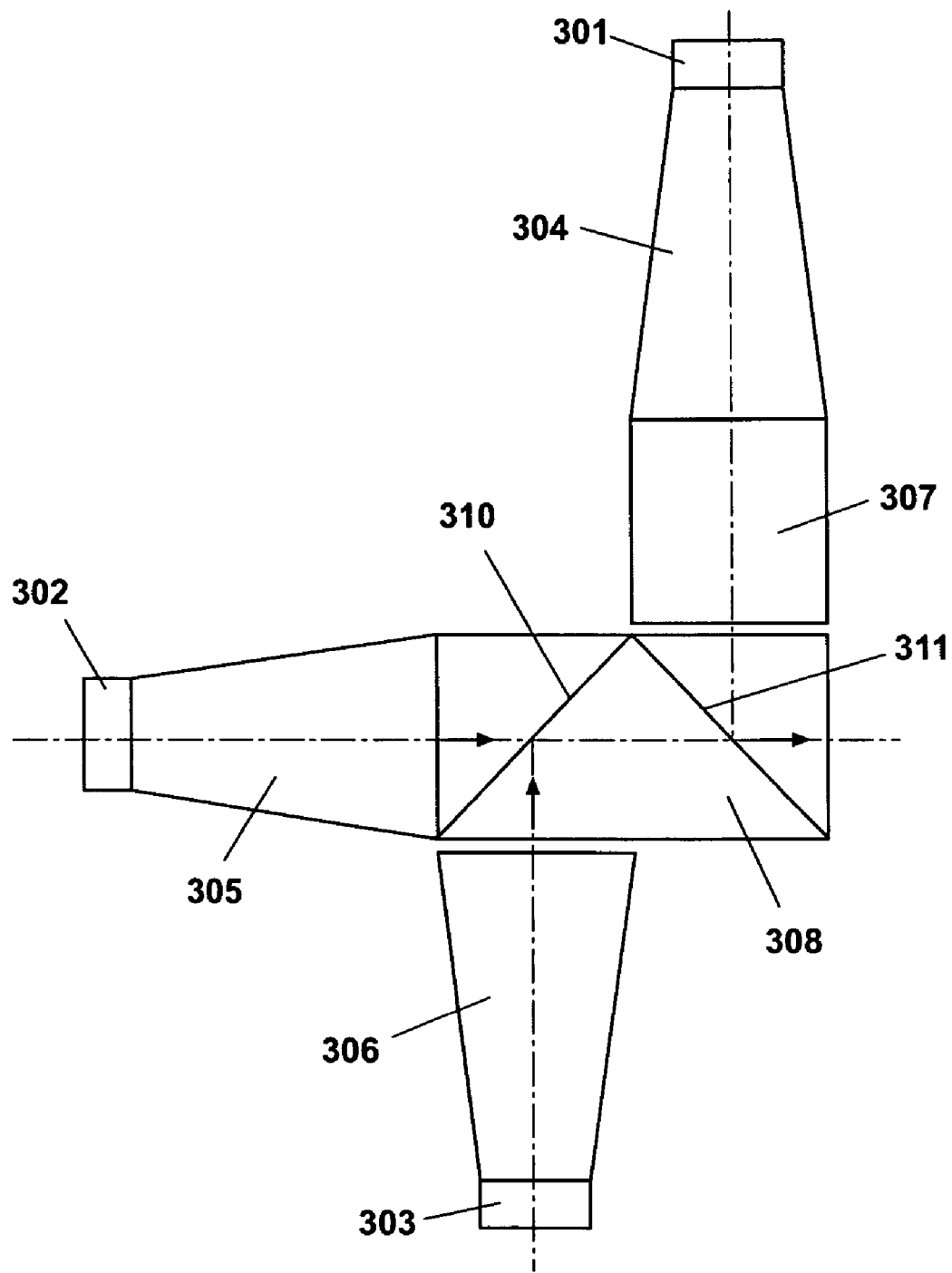
FIG. 3 is a block diagram illustrating the use of a non-polarized V-type dichroic combiner in accordance with an alternative embodiment of the invention.

FIG. 3 shows another embodiment of the invention where a V-type non-polarized dichroic combiner 308 or other shaped combiner can be employed to replace the cross-dichroic combiner shown in FIG. 1 and FIG. 2. The main advantages of the V-type non-polarized dichroic combiner 308 as compared to the non-polarized cross-dichroic combiner are in its low cost and ease of manufacture. Typically, the angular tolerance of a V-type dichroic prism is a few arc minutes while the angular tolerance of a cross-dichroic prism is a few arc seconds. The V-type dichroic combiner 308 includes two different dichroic coatings 310 and 311. The coating 310 transmits green and red color and reflects blue color while the coating 311 transmits green and blue color and reflects red color. The light emitting from green LED 302, guided by waveguide 305, passes through the dichroic coatings 310 and 311, while the light emitting from the blue LED 303, guided by waveguide 306, is reflected from the coating 310 and passes through the coating 311.

An optional glass volume 307 is attached to the exit surface of the red waveguide 304 to adjust the optical path length of the red LED 301 to equal that of the green and blue LED 301, 303. The light emitting from the red LED 301, passing through the tapered waveguide 304 and glass volume 307, is reflected from the coating 311. On the exit face of the V-type dichroic combiner 308, the optical axes of the red path, green path and blue path are coincident. The function of the gap between the blue waveguide 306 and dichroic combiner 308 and the gap between the glass volume 307 and dichroic combiner 308 is similar to that described in FIG. 1. The light exiting from the green waveguide 305 reflects internally on both side surfaces of the V-type dichroic combiner 308 and the escape of green light into the blue and red waveguides 306, 307 can be prevented.

Figure 4:
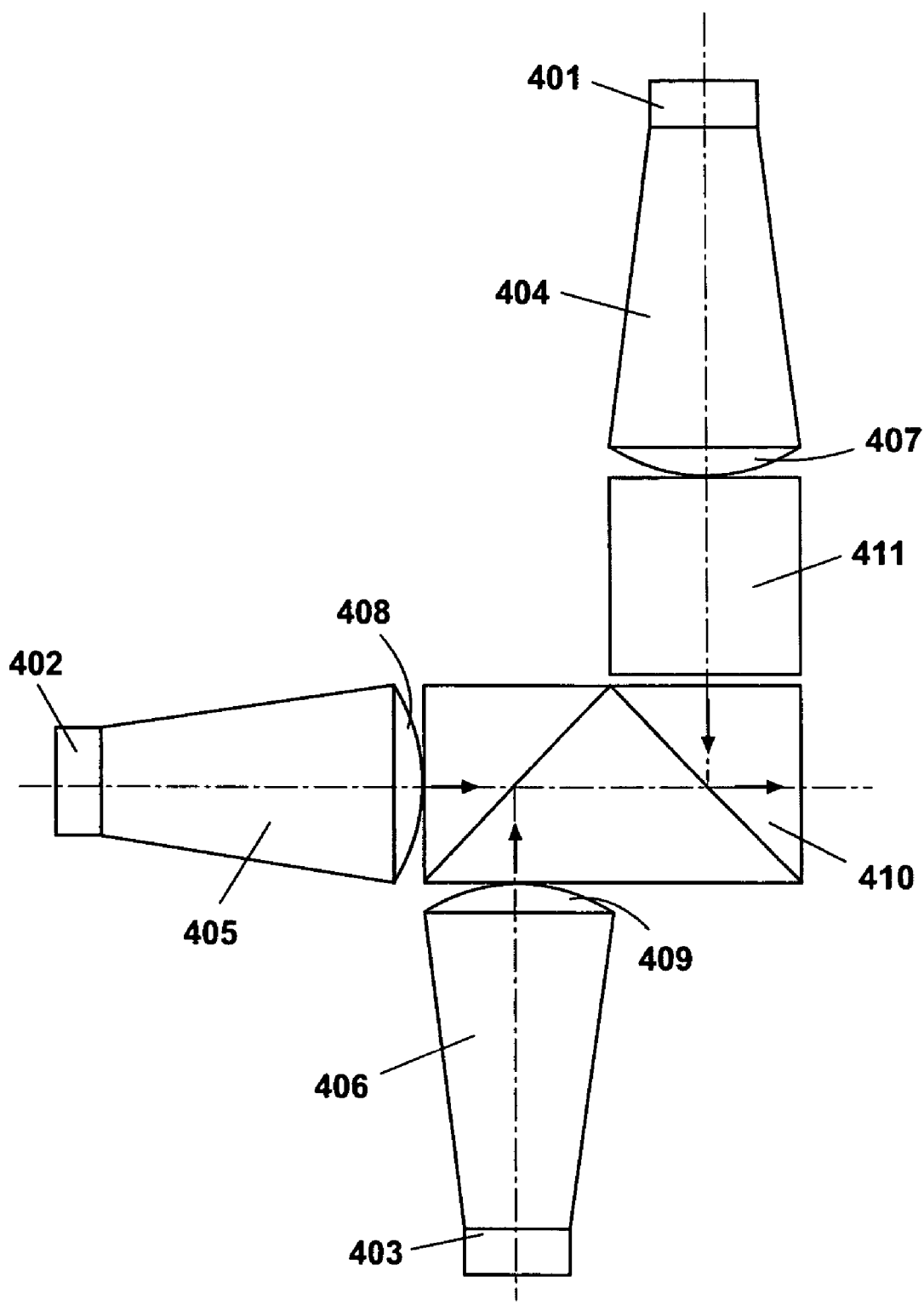
FIG. 4 is a block diagram illustrating yet another alternative embodiment of the present invention with lenses added to exit faces of the waveguides shown in FIG. 3.

FIG. 4 is another embodiment of the invention as shown in FIG. 3, where three lenses 407, 408 and 409 are attached to the red, green and blue waveguides 404, 405 and 406, respectively. The light exiting from the three waveguides 404, 405 and 406 is further converged by three lenses 407, 408 and 409 and then enter to the V-type dichroic combiner 407 as described in FIG. 3. If the waveguide is made of solid glass rod, the lens and corresponding rod can be integrated into a one-piece optical component.

Figure 5:
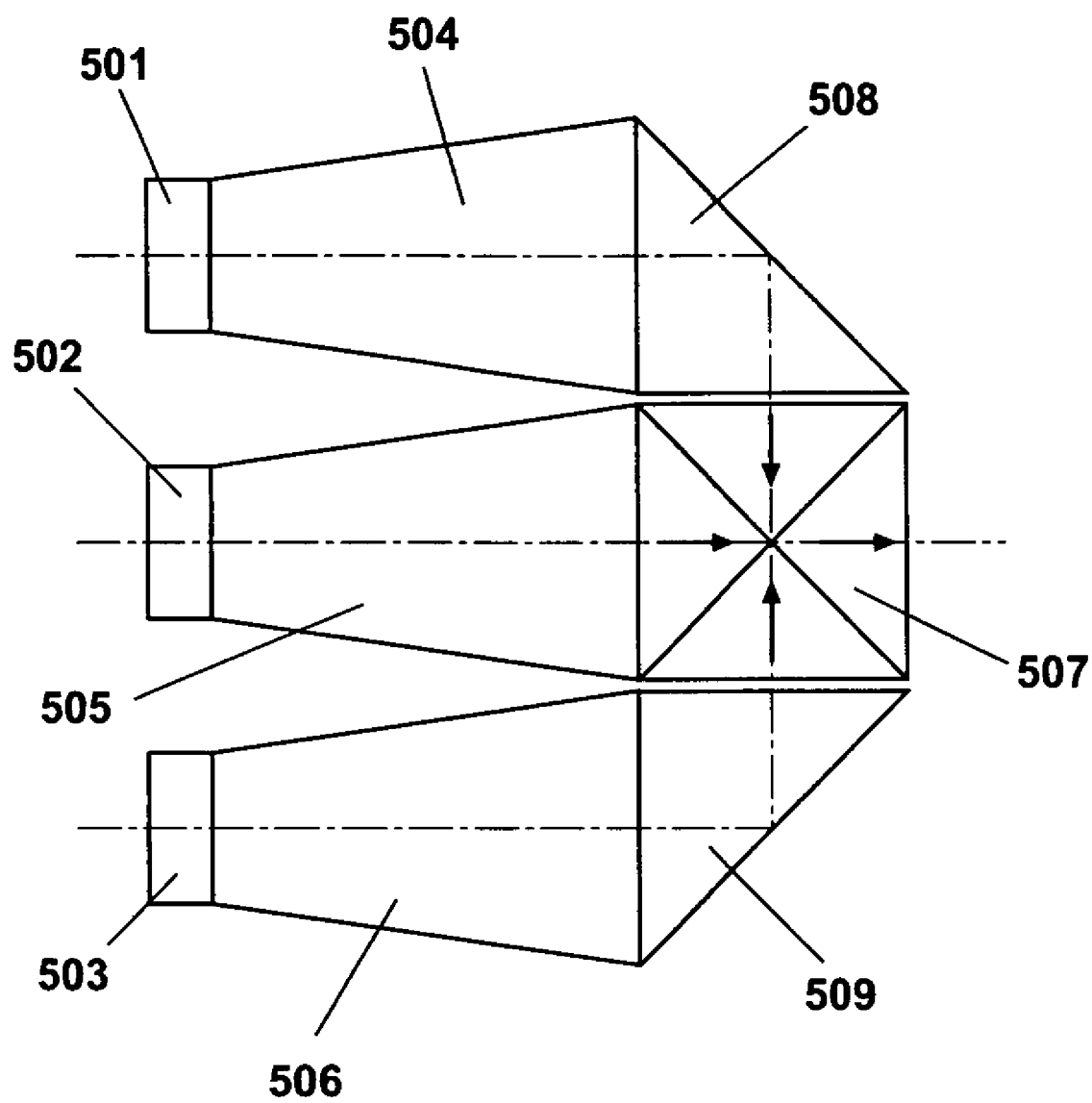
FIG. 5 is a block diagram illustrating yet another alternative embodiment of the present invention wherein the light-emitting devices shown in FIG. 1 are arranged on the same plate.

FIG. 5 shows yet another embodiment of the present invention where the system includes a red LED 501, a green LED 502, a blue LED 503, three tapered waveguides 504, 505 and 506, a cross-dichroic combiner 507 and two 45-degree prisms 508 and 509. In contrast to the color illumination assembly shown in FIG. 1, three LEDs are configured to be on the same plate, enabling the system to be more compact in size for the LED driver circuits and cooling. Two 45-degree prisms 508 and 509 are arranged adjacent to two side surfaces of the non-polarized cross-dichroic combiner 507. Gaps or spaces are included between both of the 45-degree prisms 508, 509 and the non-polarized cross-dichroic combiner 507. The 45-degree prisms may include a high reflection coating at the reflecting surface to increase light efficiency. Consequently, the light from the red LED 501, passing through the waveguide 504, is reflected from the 45-degree prism 508 and then reflected from the cross-dichroic combiner 507. Similarly, the light from the blue LED 503, passing through the waveguide 506 is reflected from the 45-degree prism 509 and then reflected from cross-dichroic combiner 507. The green light of LED 502, passing through the waveguide 505, transmits through the cross-dichroic combiner 507. As a result, the red, green and blue optical axes are coincident on the exit face of the non-polarized dichroic combiner 507.

Figure 6:
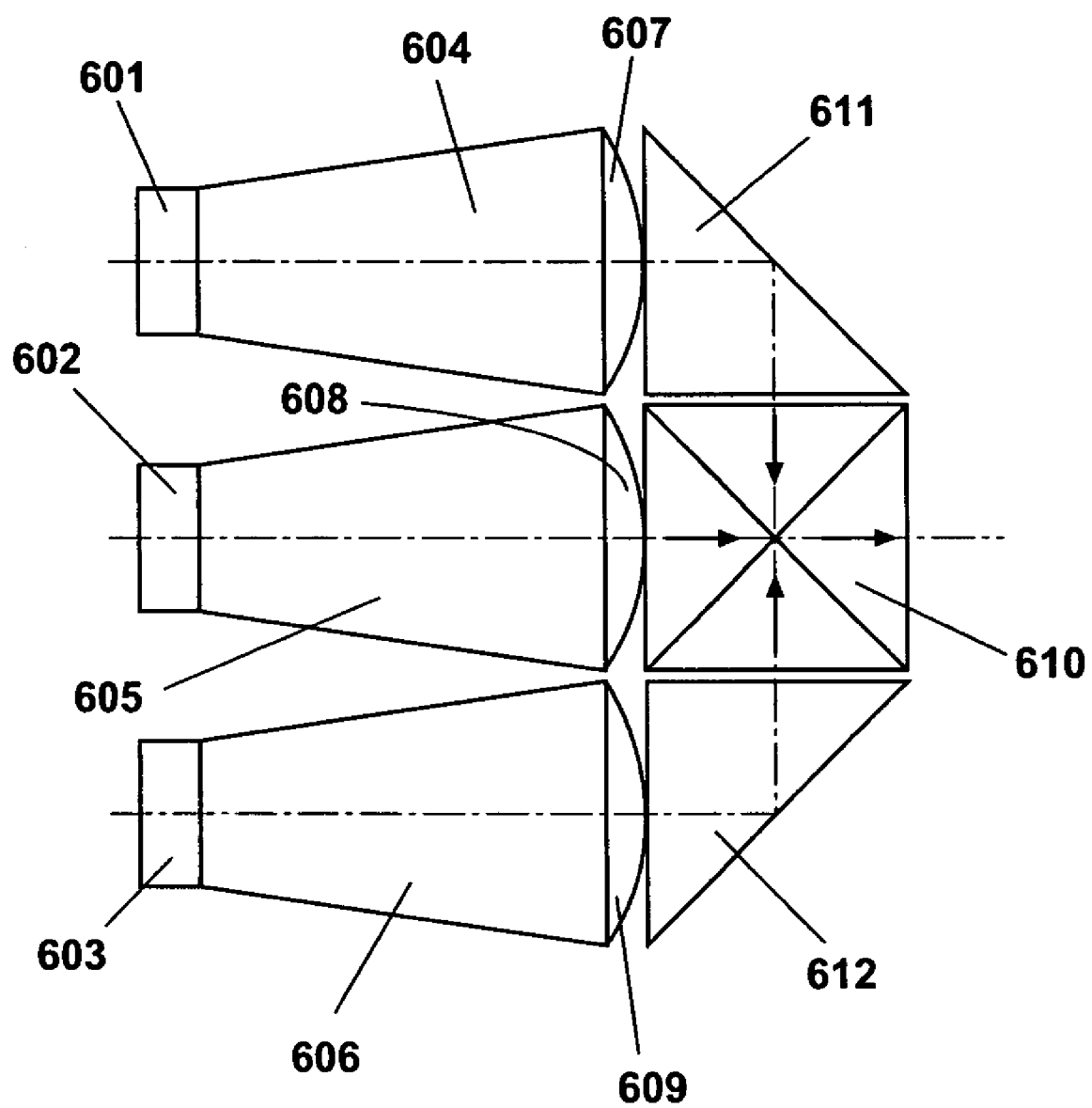
FIG. 6 is a block diagram illustrating yet another alternative embodiment of the present invention with lenses added to exit faces of the waveguides shown in FIG. 5.

As seen in FIG. 6, the embodiment shown in FIG. 5 can be further improved by adding three lenses to the tapered waveguides. Three lenses 607, 608 and 609 are attached to the red, green and blue waveguides 604, 605 and 606, respectively. The light beams exiting from three waveguides 604, 605 and 606 are further converged by three lenses 607, 608 and 609 and then enter the cross-dichroic combiner 610. If the tapered waveguide is a solid glass rod, the lens and corresponding rod can be integrated to a one-piece optical component. Those skilled in the art will further recognize that FIG. 6 may be further modified in the event that a collimating lens is required at the input of the waveguide.

Figure 7:
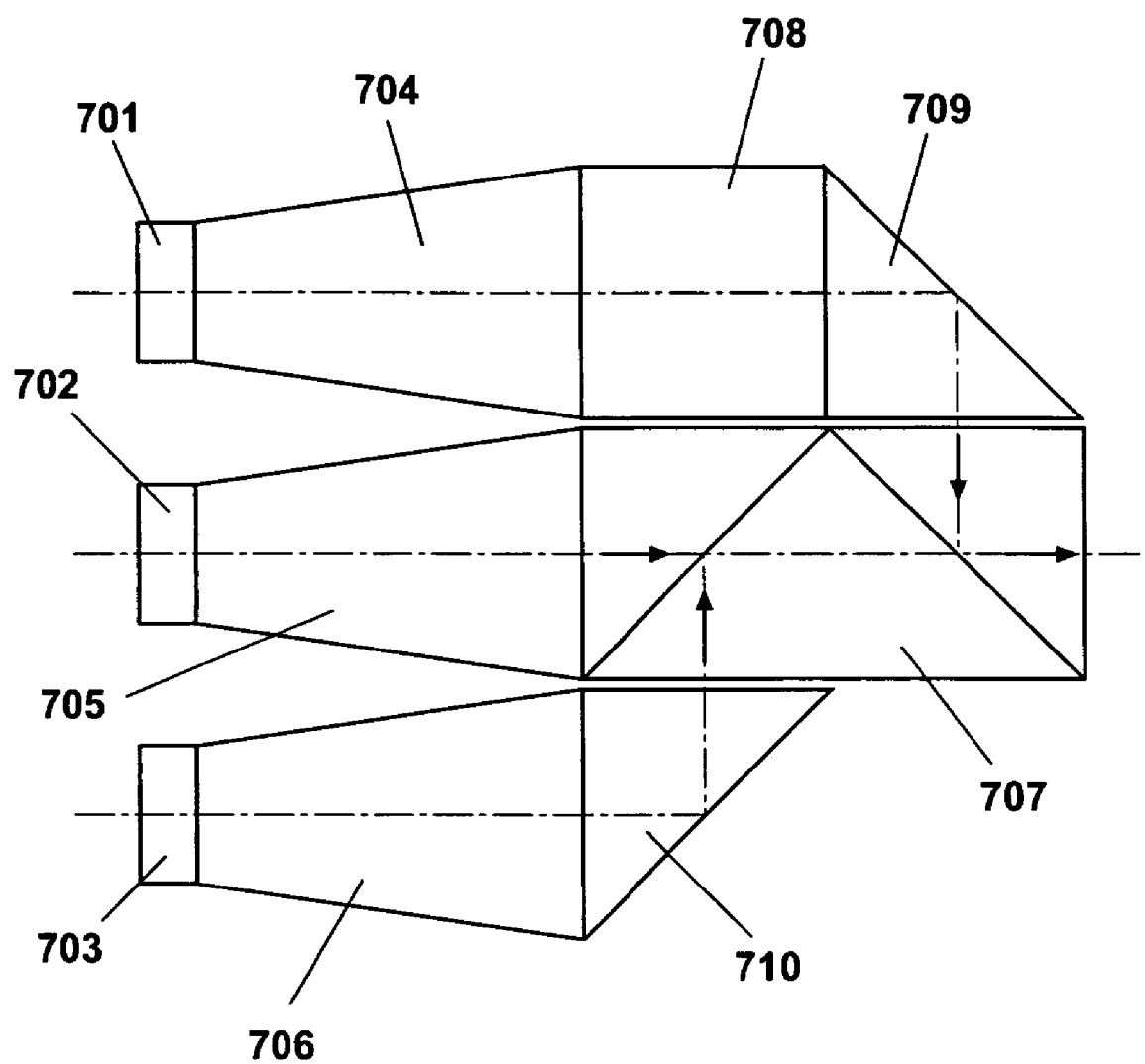
FIG. 7 is a block diagram illustrating yet another alternative embodiment of the present invention where a non-polarized V-type dichroic combiner is used with the system as shown in FIG. 5.
Figure 8:
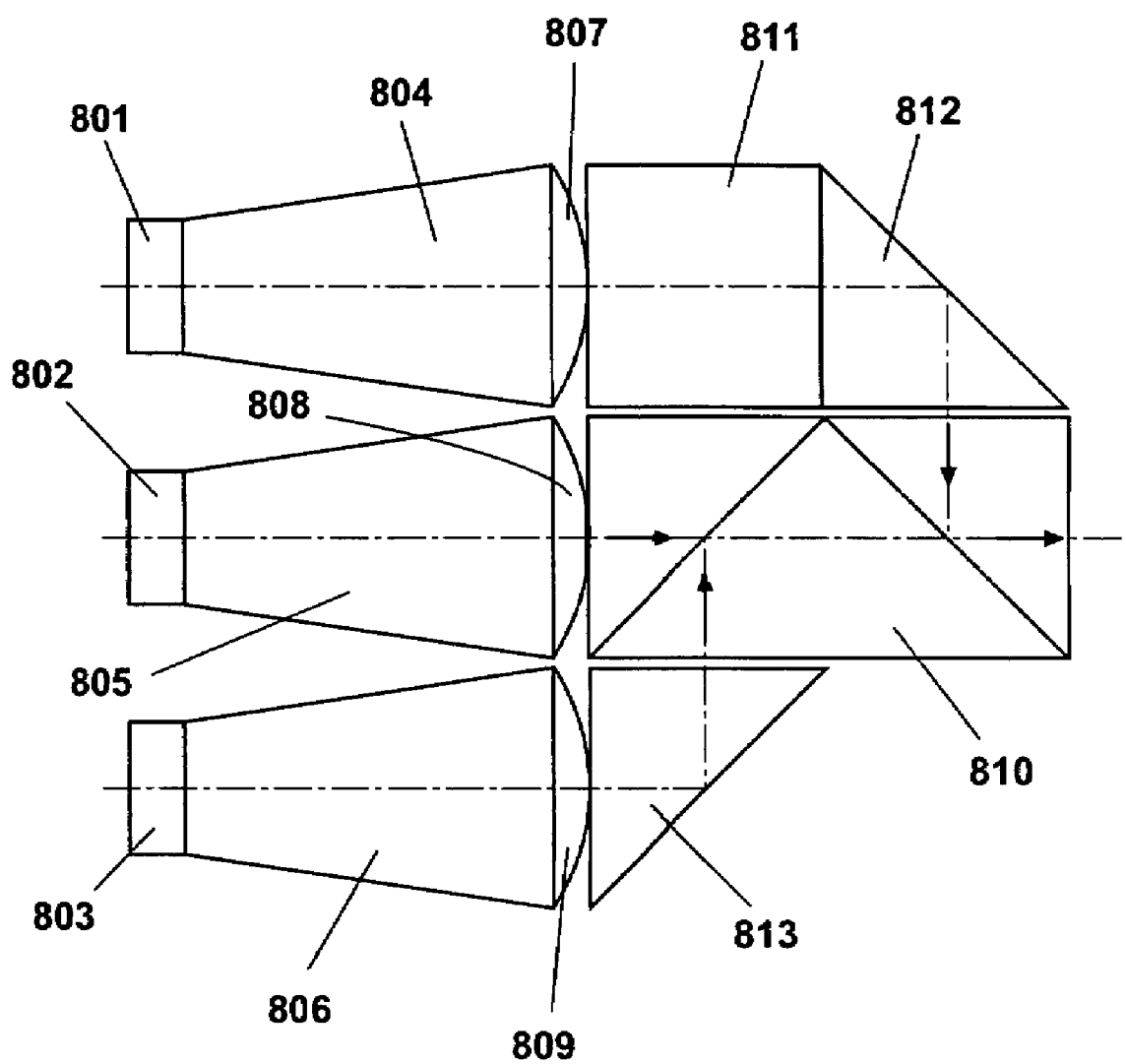
FIG. 8 is a block diagram illustrating an alternative embodiment of the present invention with lenses added to exit faces of the waveguides shown in FIG. 7.

FIG. 7 and FIG. 8 further illustrate a non-polarized V-type dichroic combiner 707, 810 that can replace the non-polarized cross-dichroic combiners in FIG. 5 and FIG. 6. The system shown in FIG. 7 includes a red LED 701, a green LED 702, a blue LED 703, three tapered waveguides 704, 705 and 706, a V-type dichroic combiner 707, a glass volume 708 and two 45-degree prisms 709 and 710. As noted in previous embodiments of the invention, FIG. 8 illustrates the invention in FIG. 7 further improved through the addition of three lenses to the waveguides. In this embodiment, three lenses 807, 808 and 809 are attached to the red, green and blue waveguides 804, 805 and 806, respectively. The light beams emitting from red LED 801, green LED 802 and blue LED 803 exit the three waveguides 804, 805 and 806 and are further converged by three lenses 807, 808 and 809. The advantages of utilizing a V-type dichroic combiner as compared to the cross-dichroic combiner are those that have been already discussed herein.

Figure 11:
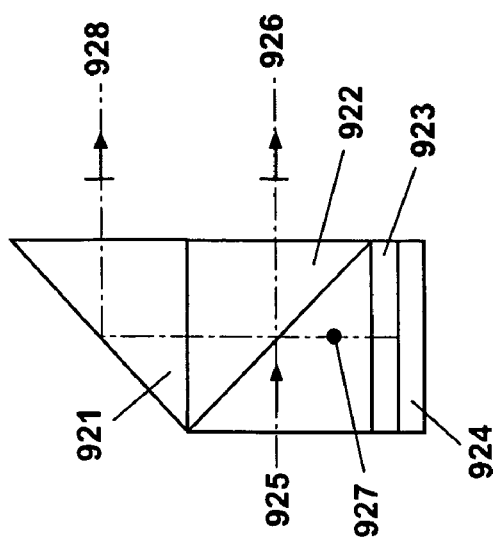
FIGS. 9, 10 and 11 are block diagrams illustrating three different embodiments of a polarization converter system of the present invention.
Figure 10:
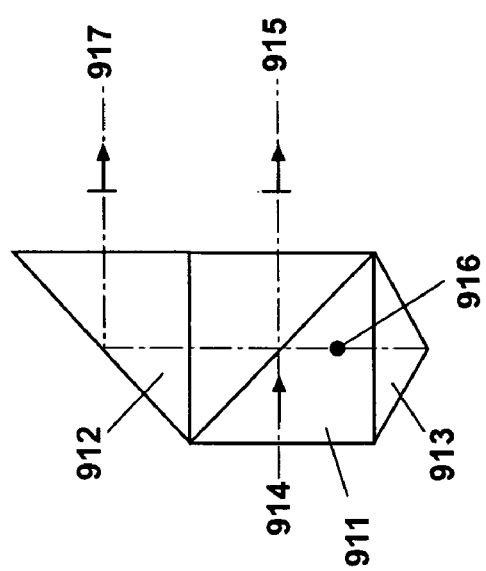
Figure 9:
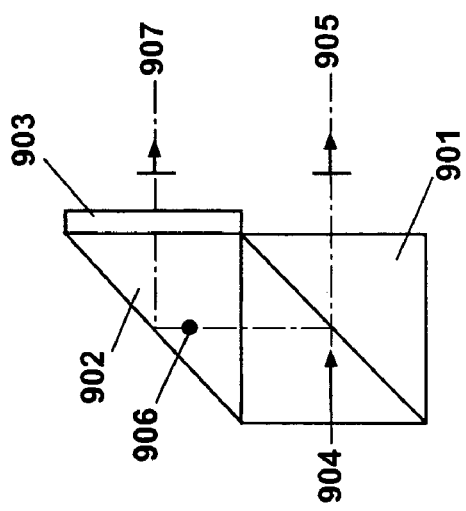

FIGS. 9, 10 and 11 illustrate embodiments used for polarized light applications where polarization recovery and recirculation are included to improve overall polarization efficiency. The polarization recovery apparatus shown in FIG. 9 includes a polarizing beam split (PBS) 901, a 45-degree prism 902 and a half wave plate 903. The light 904 entering the entrance surface (the left surface) of PBS 901 is split into the s-polarized light 906 and the p-polarized light 905. The p-component 905 propagates through PBS 901 while the s-component 906 is reflected upwardly through the 45-degree prism 902 to the half wave plate 903. The half wave plate 903 rotates the polarization state of the s-component 906 to p-polarized component 907 to propagate in a direction parallel to the direction of the p-component 905.

FIG. 10 shows yet another embodiment of a polarization recovery apparatus of the present invention. The apparatus includes a PBS cube 911, a 45-degree prism 912, and a retro-reflective polarization rotator 913. As will be recognized by those skilled in the art, a detailed description of a retro-reflective polarization rotator can be found in U.S. Patent Publication No. 2004/0090763 which is herein incorporated by reference. The principal advantage of this apparatus is that it is not sensitive to wavelength variations of the incoming light, temperature changes and polarization alignment errors. The incident light 914 entering the PBS 911 is split into the s-polarized light 916 and the p-polarized light 915. The p-component 915 transmits through the PBS 911. Unlike the embodiment shown in FIG. 9, a polarization rotator 913 is used to replace the half waveplate in order to rotate the polarization direction of the s-component 916 coming from the PBS 911 by rotating the polarization direction of the incoming beam by 90 degrees. After being reflected by the polarization rotator 913, the otherwise unused s-component 916 becomes a p-polarized beam 917 and passes through the PBS cube 911 to the prism 912. The 45-degree prism 912 thereafter redirects the p-polarized beam 917 in a propagation direction parallel to the direction of the p-component 915.

FIG. 11 illustrates still yet another alternative embodiment of a polarization recovery apparatus that includes a PBS cube 922, a 45-degree prism 921, a quarter wave plate 923 and a mirror 924. The light 925 entering the PBS 922 is split into s-polarized light 927 and p-polarized light 926. The p-component 926 propagates through the PBS 922. The s-component 927 propagates past the quarter wave plate 923 where it becomes circularly polarized. After being reflected from the mirror 924, it again passes through the quarter wave plate 923 and becomes p-polarized light. The recovered p-component 928 passes through the PBS cube 922 to the prism 921. The 45-degree prism 921 then redirects the beam 928 in a propagation direction parallel to the direction of p-component 926. Each polarization recovery apparatus shown in FIGS. 9, 10 and 11 can be combined with any LED assembly shown in FIG. 1-FIG. 8 to provide an LED color illumination system for polarized light projection applications. Six exemplary embodiments are shown in FIG. 12-FIG. 17.

Figure 12:
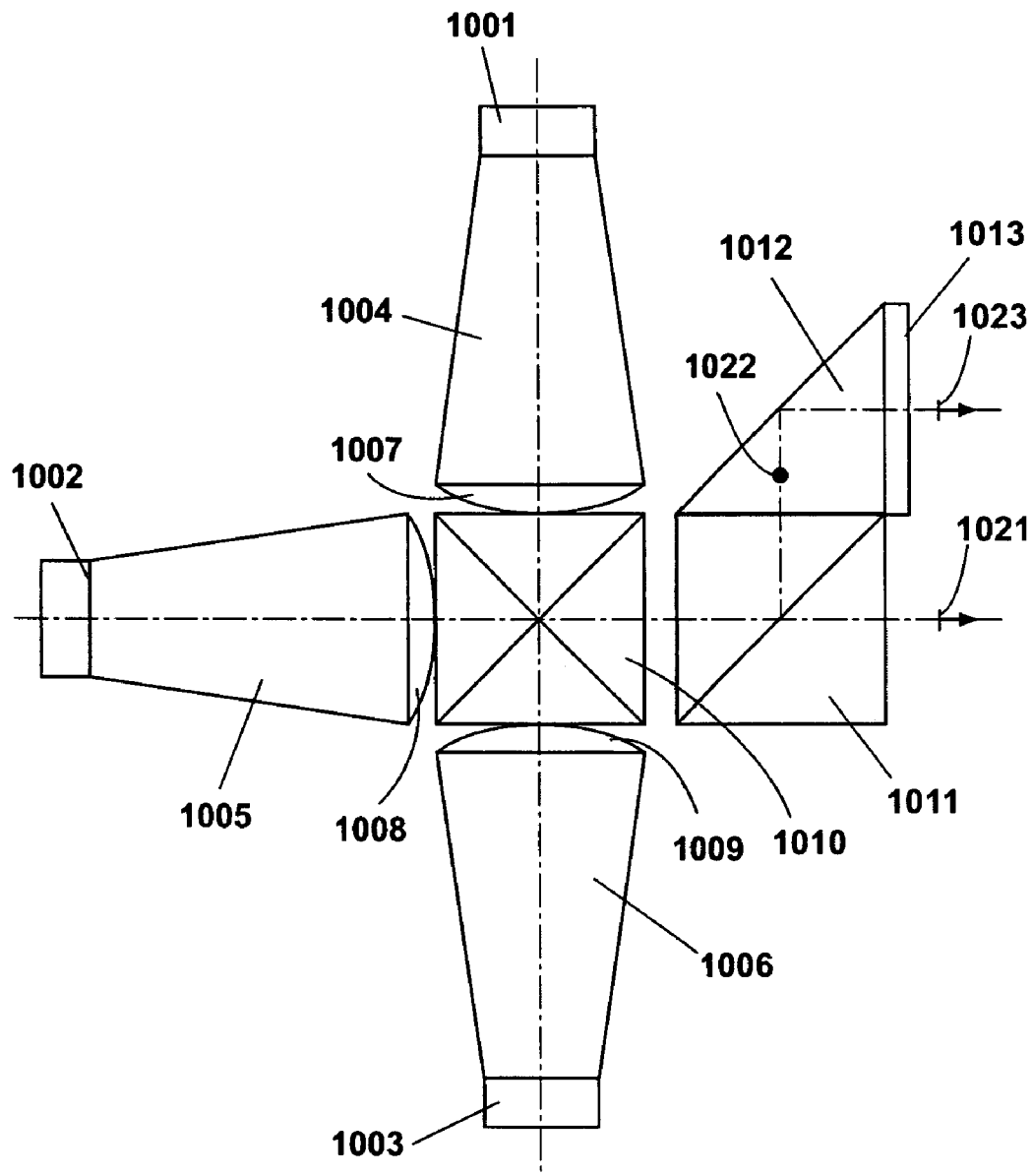
FIG. 12 is a block diagram illustrating an LED color illumination system in accordance with the present invention, combining the assembly shown in FIG. 2 with a polarization recovery system shown in FIG. 9.

FIG. 12 illustrates an embodiment of a color illumination apparatus with a polarization recovery system in accordance with the present invention. The system includes a red LED 1001, a green LED 1002, a blue LED 1003, three tapered waveguides 1004, 1005 and 1006, three lenses 1007, 1008 and 1009, a non-polarized cross-dichroic combiner 1010, a PBS 1011, a 45-degree prism 1012, and a half wave plate 1013. The light from the red LED 1001, passing through the waveguide 1004, is converged by lens 1007 and then reflected from the non-polarized cross-dichroic combiner 1010. Similarly, the light from the blue LED 1003, passing through the waveguide 1006, is converged by lens 1009 and then reflected from cross-dichroic combiner 1010. The green light of LED 1002, passing through the waveguide 1005, is converged by lens 1008 and then transmits through the non-polarized cross-dichroic combiner 1010. The red, green and blue axes are coincident on the exit face of the non-polarized dichroic combiner 1010. The light output from the non-polarized cross-dichroic combiner 1010 is split by PBS 1011 into s-polarized light 1022 and p-polarized light 1021. The p-component 1021 transmits through the PBS 1011 while the s-component 1022 is reflected upwardly and is further reflected by the 45-degree prism 1012 to the half wave plate 1013. The half wave plate 1013 rotates the polarization state of the s-component 1022 to p-polarized component 1023 that propagates in a direction parallel to the direction of the p-component 1021. In fact, the color illumination system shown in FIG. 10 is a combination of an LED assembly shown in FIG. 2 with the polarization recovery apparatus shown in FIG. 9.

Figure 13:
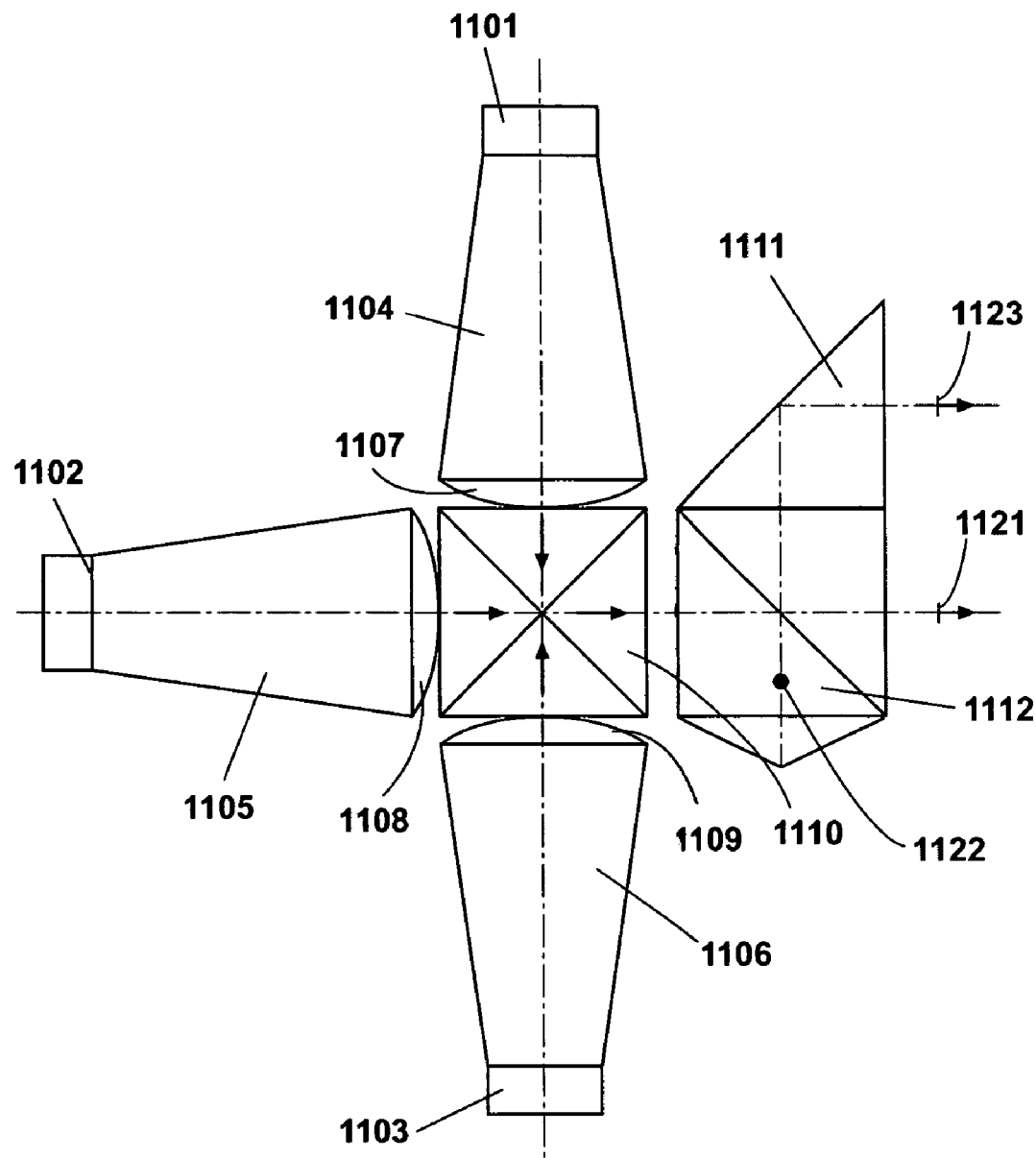
FIG. 13 is a block diagram illustrating an alternative embodiment of an LED color illumination system combining the assembly shown in FIG. 2 with the polarization recovery system shown in FIG. 10.
Figure 14:
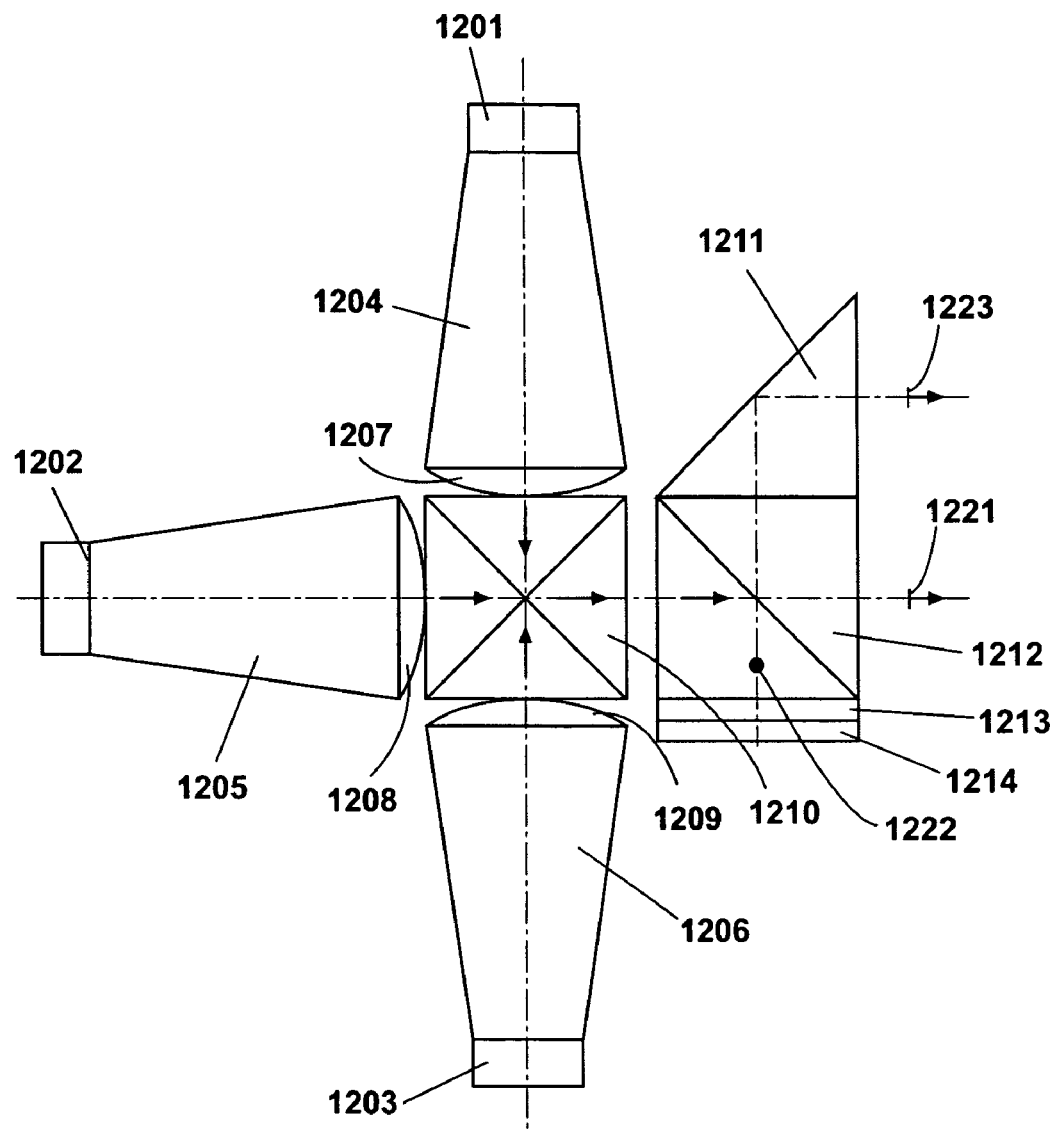
FIG. 14 is a block diagram illustrating an alternative embodiment of an LED color illumination system combining the assembly shown in FIG. 2 with the polarization recovery system shown in FIG. 11.
Figure 15:
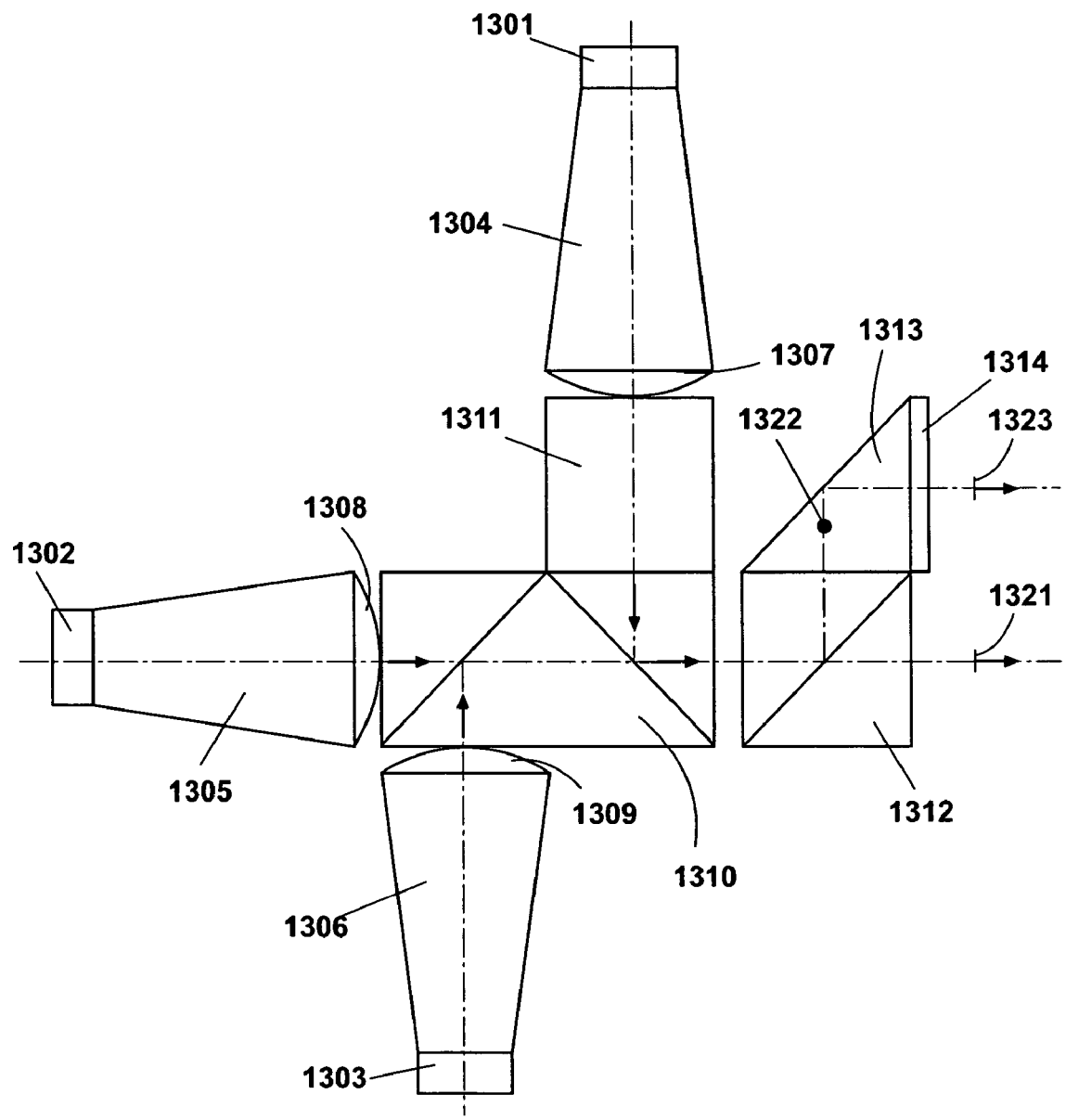
FIG. 15 is a block diagram illustrating yet another alternative embodiment of an LED color illumination system combining the assembly shown in FIG. 4 with the polarization recovery system showing in FIG. 9.
Figure 16:
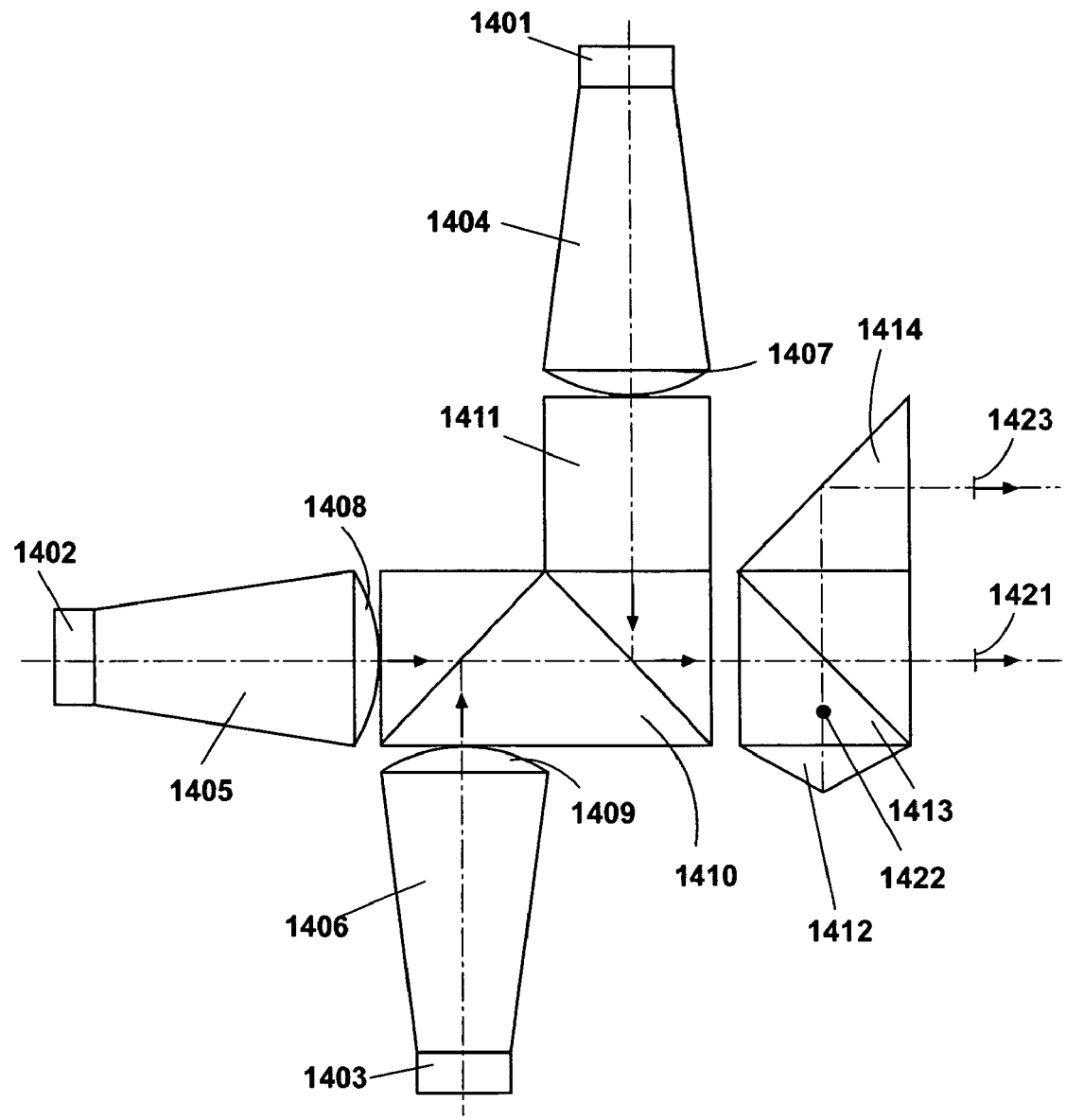
FIG. 16 is a block diagram illustrating yet another alternative embodiment of an LED color illumination system combining an assembly shown in FIG. 4 with the polarization recovery system shown in FIG. 10.
Figure 17:
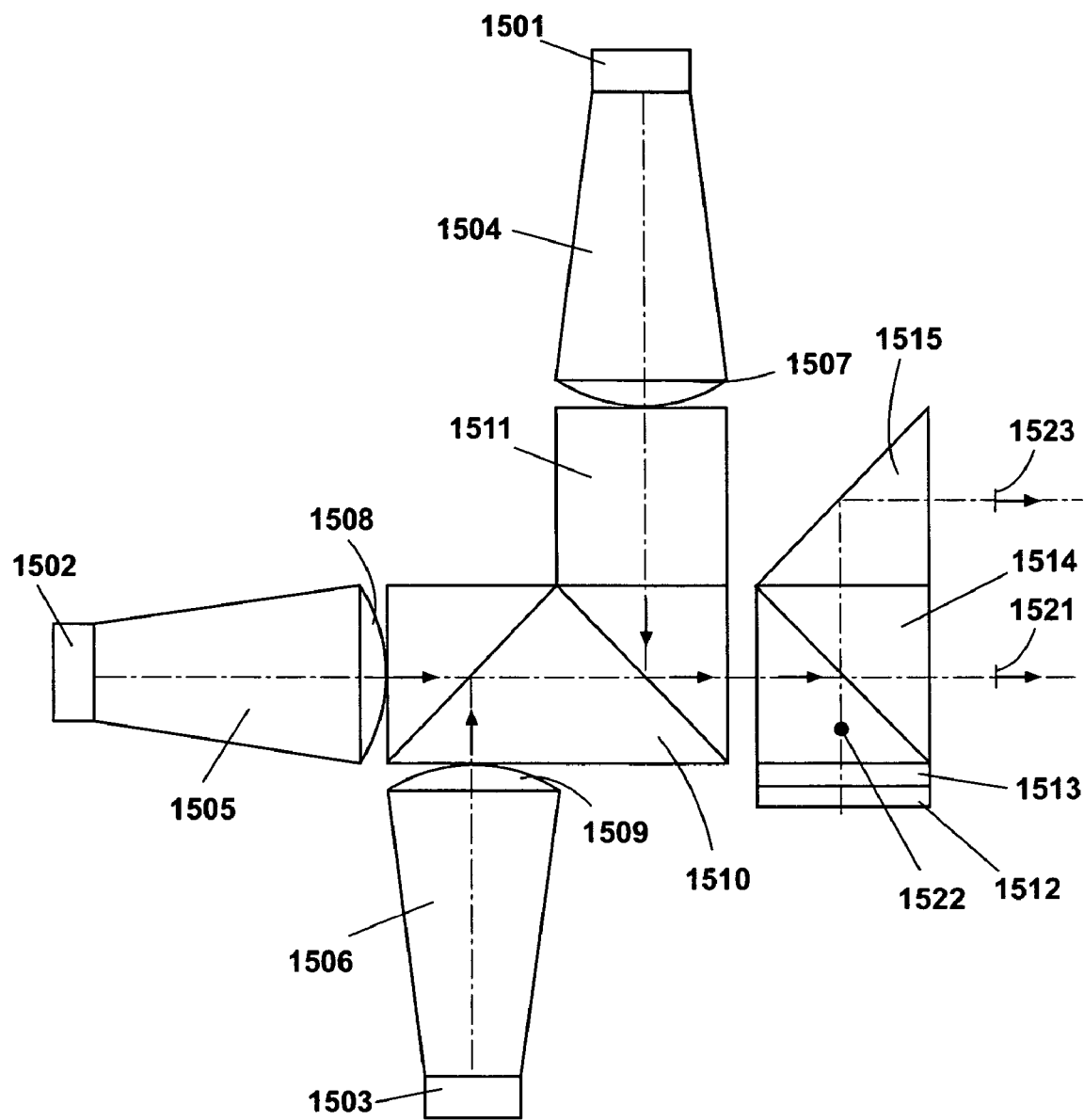
FIG. 17 is a block diagram illustrating yet another alternative embodiment of an LED color illumination system combining an assembly shown in FIG. 4 with the polarization recovery system shown in FIG. 11.
Figure 18:
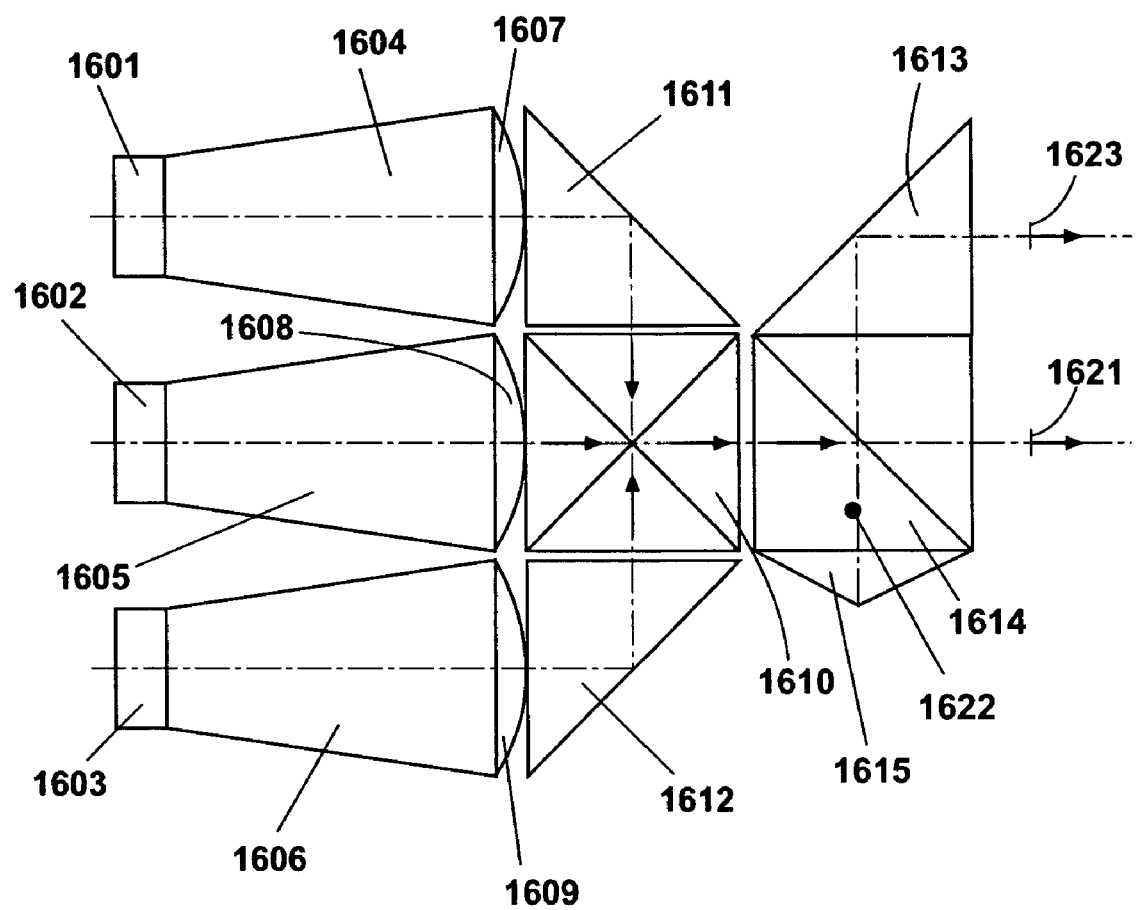
FIG. 18 is a block diagram illustrating yet another alternative embodiment of an LED color illumination system combining an assembly shown in FIG. 6 with the polarization recovery system shown in FIG. 10.

Similarly, FIG. 13-FIG. 18 illustrate other exemplary embodiments of the color illumination system. FIG. 13 illustrates the combination of the LED assembly shown in FIG. 2 with a polarization recovery apparatus shown in FIG. 10. The embodiment in FIG. 14 joins the LED assembly shown in FIG. 2 and a polarization recovery apparatus shown in FIG. 11. FIG. 15 is a combination of the LED assembly shown in FIG. 4 and the polarization recovery apparatus shown in FIG. 9. FIG. 16 is a combination of the LED assembly shown in FIG. 4 and a polarization recovery apparatus shown in FIG. 10. FIG. 17 is a combination of the LED assembly shown in FIG. 4 and a polarization recovery apparatus shown in FIG. 11. Finally, FIG. 18 is a combination of an LED assembly shown in FIG. 6 and a polarization recovery apparatus shown in FIG. 10. As will be recognized by those skilled in the art, each of the individual components of these exemplary embodiments have been described herein and those descriptions should also be applied to the components shown in FIGS. 13-18.

The non-polarized cross-dichroic combiners or V-type combiners shown in FIG. 1-FIG. 16 are all designed for non-polarized beams. Thus, the transmission properties of the coatings inside the dichroic combiners are very similar for both p-component and s-component. Alternatively, there is yet another type of dichroic combiner referred to as a "polarizing dichroic combiner." A polarizing dichroic combiner is designed for combining polarized incoming color beams. It will be evident to those skilled in that art that most of the polarizing dichroic combiners on the market are the SPS-type. An SPS combiner reflects red and blue s-components of the light and transmits a green p-component. The main advantage of the polarizing dichroic combiner over the non-polarized dichroic combiner is that it has steeper transitional curves between the pass wavelength band and the stop wavelength band so that loss in the transitional band can be reduced.

Figure 19:
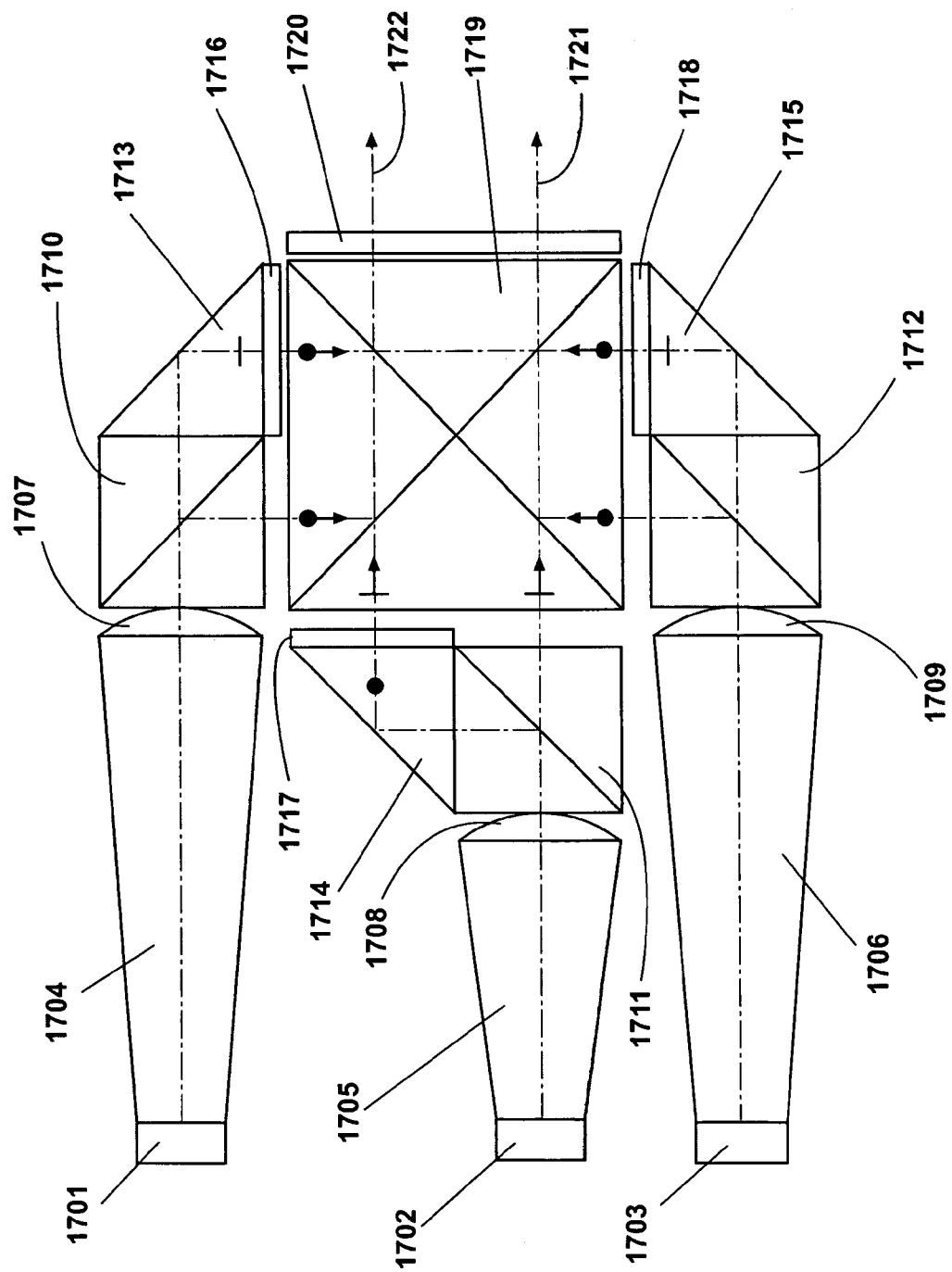
FIG. 19 is a block diagram illustrating yet another alternative embodiment of an LED color illumination system using a polarizing cross-dichroic combiner for color combining.

FIG. 19 shows an embodiment of a light illumination apparatus of the present invention which utilizes a polarizing dichroic combiner. The apparatus as shown in FIG. 19 includes a red LED 1701, a green LED 1702, a blue LED 1703, three tapered waveguides 1704, 1705 and 1706, three lenses 1707, 1708 and 1709, three polarizing beam splitter (PBS) cubes 1710, 1711 and 1712, three 45-degree prisms 1713, 1714 and 1715, three half wave plates 1716, 1717 and 1718, a polarizing cross-dichroic combiner 1719, and a polarized-retarder-stack plate 1720. The polarized-retarder-stack is known in the art and disclosed in U.S. Pat. No. 5,751,384 and is herein incorporated by reference. In operation, the light from the red LED 1701 passes through the waveguide 1704 and lens 1707 to the PBS cube 1710. The s-component is reflected from the PBS cube 1710 while the p-component passes through 1710 to the 45-degree prism 1713. The p-polarized light exiting from the prism 1713 goes through the half wave plate 1716 and becomes s-polarized beam.

Both s-components, i.e., the s-component directly reflected from the PBS 1710 and the s-component exiting from the half wave plate 1716, are reflected by the polarizing cross-dichroic combiner 1719 and pass through the polarized-retarder-stack plate 1720. Similarly, the light beam emitting from the blue LED 1703 and passing through the waveguide 1706 and lens 1709 is split by the PBS cube 1712. The s-component is reflected from the PBS cube 1712 while the p-component passes through 1712 to the 45-degree prism 1715. The p-polarized light exiting from the prism 1715 goes through the half wave plate 1718 and becomes s-polarized beam. Both s-components, namely, the s-component directly reflected from the PBS 1712 and the s-component exiting from the half wave plate 1718 are reflected by the polarizing cross-dichroic combiner 1719 and pass through the polarized-retarder-stack plate 1720. Different from the red and blue LED light paths wherein the light entering the polarizing cross-dichroic combiner is s-polarized, the light along green LED path entering the polarizing cross-dichroic combiner 1719 is p-polarized. The light from the green LED 1702 passes through the waveguide 1705 and lens 1708 to the PBS cube 1711. The p-component passes PBS 1711 while the s-component is reflected by the PBS 1711 and the 45-degree prism 1714. The s-polarized light exiting from the prism 1714 goes through the half wave plate 1717 and becomes p-polarized. Both p-components, the p-component directly passing the PBS 1711 and the p-component exiting from the half wave plate 1717, pass through the polarizing cross-dichroic combiner 1719 and the polarized-retarder-stack plate 1720. Thus, the polarized-retarder-stack plate 1720 selectively changes the polarization direction of the green beam while maintaining the polarization direction of red and blue beams. It can also be designed to maintain the polarization direction of the green beam while changing the polarization directions of red and blue beams.

Figure 22:
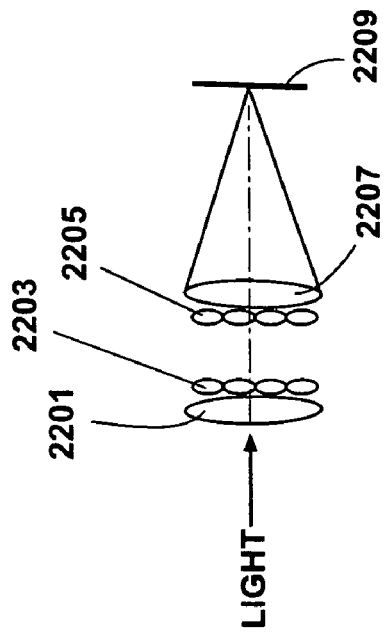
FIGS. 20-23 are block diagrams illustrating light projection systems for projecting light from a dichroic combiner to a microdisplay panel.
Figure 20:
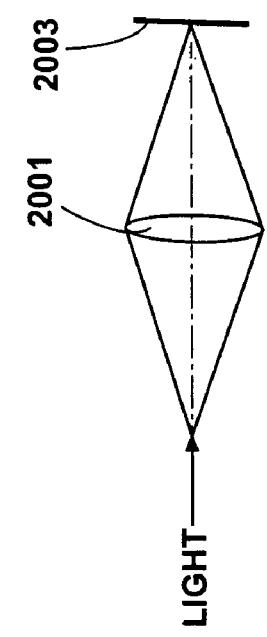
Figure 21:
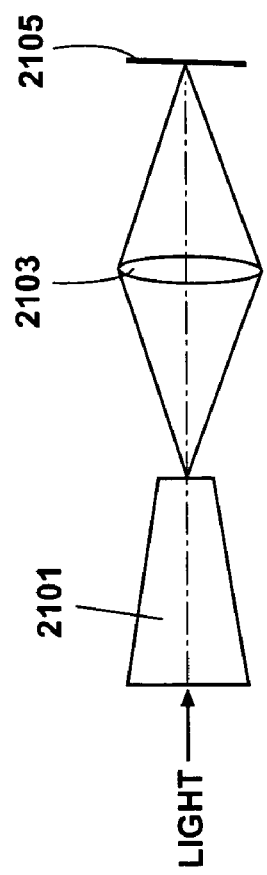

FIGS. 20-23 are diagrams illustrating light integrator and condenser lens systems. These systems are used for conveying non-polarized light from a dichroic combiner to a DMD panel. FIG. 20 shows a condenser lens 2001 that is used to directly propagate a uniform output beam of light onto a DMD panel 2003. In FIG. 21, a waveguide integrator 2101 and condenser lens 2103 are used to focus light onto a DMD panel 2103. Those skilled in the art will recognize that the waveguide 2101 may be tapered or an additional condenser lens may be used to focus light into the entrance of the rectangular waveguide 2101. The output of the waveguide 2101 is projected by the focusing lens 2103 on the DMD panel 2105 and can be a tapered light pipe or a tapered rod integrator with increasing taper, decreasing taper or straight shape. The shape of the exit surface of the waveguide 2101 should be proportional that of the DMD panel 2105. FIG. 22 shows yet another embodiment of a light integrator and condenser lens system where a collimation lens 2201, a first lens array 2203, second lens array 2205 and a focusing lens 2207 are used to project light onto a DMD panel 2209. The first lens array 2203 works to separate and focus the light while the second lens array 2205 forms an image of the pupil of each corresponding lens in the first lens array 2201. The focusing lens 2207 then operates overlapping the images of the pupil from each of the lenses in the second lens array 2203 to provide uniform illumination to the DMD panel 2205.

Figure 23:
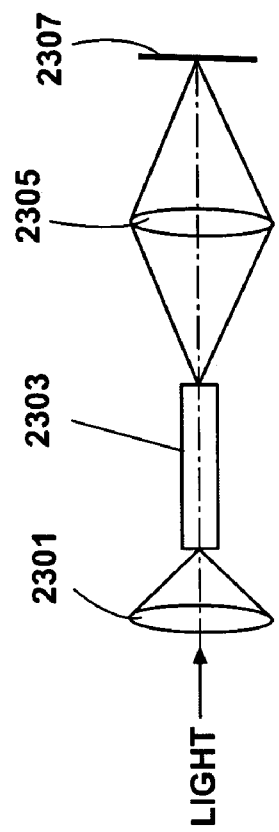

Finally, FIG. 23 illustrates yet another embodiment where a condenser lens 2301 is used to focus light into an integrator pipe 2303 where a focusing lens 2305 is used to focus the light onto a DMD panel 2307.

Thus, the present invention is directed to a polarized light illumination source using light beams emitted from multi-color LEDs as used with non-polarized DMD projection applications. The invention offers an advantage by improving the color gamut of the imaging whereby unwanted UV or IR light is eliminated and the luminous efficiency of the light source is significantly increased. More specifically, the invention provides a polarized light illumination source that is comprised of at least one red, green and blue LED as the light source. A plurality of tapered waveguides are arranged so as to achieve light homogenization, collimation and a light guide for the light source. A non-polarized dichroic combiner is used for mixing incoming beams to form a combined color light flux while a polarizing beam splitter (PBS) separates the non-polarized beam into two linearly polarized components. A polarization converter converts the polarity of an unusable polarized component to the polarity of a usable polarized component and a 45-degree prism redirects the recovered polarized beam toward a direction of illuminating an image display panel. Finally, a number of light integrator and condenser lens systems are utilized to project non-polarized light from the dichroic combiner to the DMD panel.

As will be understood by those skilled in the art, the present invention may be embodied in other specific forms without departing from the scope of the invention as a whole. Accordingly, the disclosures and descriptions herein are intended to be illustrative, but not limiting, of the scope of the invention which is set forth in the following claims.

We claim:

1. A light illumination engine comprising:
   a plurality of light emitting diode (LED) light sources;
   at least one optical waveguide associated with the plurality of LED light sources; and
   a non-polarized dichroic combiner for combining light from the at least one optical waveguide into a single light source, the non-polarized dichroic combiner being optically coupled to the plurality of LED light sources through the at least one optical waveguide.

2. A light illumination engine as in claim 1, further comprising:
   a lens for processing light from the at least one optical waveguide before entering the non-polarized dichroic combiner.

3. The light illumination engine of claim 1, wherein the at least one optical waveguide is structured to homogenize and collimate light emitted from the plurality of LED light sources.

4. A light illumination engine as in claim 3, wherein the at least one optical waveguide is a hollow light pipe.

5. A light illumination engine as in claim 3, wherein the at least one optical waveguide is a solid integrator rod.

6. A light illumination engine as in claim 3, wherein the light illumination engine is used in a television receiver.

7. A light illumination engine as in claim 1, wherein the non-polarized dichroic combiner is a cross-type combiner or a V-type combiner.

8. A light illumination engine as in claim 1, further comprising:
   at least one prism for directing light from the at least one optical waveguide to the non-polarized dichroic combiner.

9. A light illumination engine as in claim 8, wherein the at least one prism is a 45-degree prism.

10. A polarized light illumination apparatus for projecting a full color image, comprising:
    a plurality of light emitting diode (LED) light sources;
    at least one tapered waveguide associated with each of the plurality of LED light sources;
    a non-polarized dichroic combiner for combining rays from the LED light sources;
    a polarizing beam splitter (PBS) for separating S and P polarizing light exiting from the non-polarized dichroic combiner;
    a prism for forwarding the propagation direction of light from the PBS;
    a polarization converter for rotating the polarization direction of an incoming polarized beam; and
    wherein the at least one tapered waveguide processes the light from the plurality of LED light sources to the non-polarized dichroic combiner, wherein the at least one tapered waveguide is structured to collimate the light from the LED light source.

11. The polarized light illumination apparatus according to claim 10, further comprising:
    a lens attached to an exit surface of the at least one waveguide.

12. The polarized light illumination apparatus as in claim 10, wherein the plurality of LED light sources are comprised of LEDs having differing colors.

13. The polarized light illumination apparatus as in claim 10, wherein the at least one tapered waveguide homogenizes the light from the LED light source.

14. The polarized light illumination apparatus as in claim 10, wherein the at least one tapered waveguide shapes the light beam from the LED light source.

15. The polarized light illumination apparatus according to claim 10, wherein the at least one tapered waveguide is a hollow light pipe.

16. The polarized light illumination apparatus according to claim 10, wherein the at least one tapered waveguide is a solid integrator rod.

17. The polarized light illumination apparatus according to claim 10, wherein the dichroic combiner is a cross-type combiner.

18. The polarized light illumination apparatus according to claim 10, wherein the dichroic combiner is a V-type combiner.

19. The polarized light illumination apparatus according to claim 10, wherein the polarization converter is a half wave plate.

20. The polarized light illumination apparatus according to claim 10, wherein the polarization converter is a retro-reflective polarization rotator.

21. The polarized light illumination apparatus according to claim 10, wherein the polarization converter is a quarter wave plate attached to a reflective mirror.

22. The polarized light illumination apparatus as in claim 10, wherein polarized light illumination apparatus is used in a television receiver.

23. A polarized light illumination apparatus comprising:
at least one light emitting diode (LED) light source;
at least one optical waveguide associated with the at least one LED light source, the at least one optical waveguide structured to collimate light originating at the at least one LED light source, the at least one optical waveguide having an output interface for presenting collimated light;
a plurality of prisms optically coupled to the output interface of the at least one optical waveguide and operable to receive said collimated light; and
a polarizing cross dichroic combiner optically coupled to the plurality of prisms and operable to combine the collimated light from the plurality of prisms to provide a single polarized light source.

24. A polarized light illumination apparatus as in claim 23, further comprising:
at least one lens positioned to receive light from the at least one optical waveguide for shaping a light beam from the waveguide.

25. A polarized light illumination apparatus as in claim 23, wherein the at least one LED light source includes a plurality of different color LEDs.

26. The polarized light illumination apparatus according to claim 23, wherein the at least one optical waveguide is a tapered hollow light pipe.

27. The polarized light illumination apparatus according to claim 23, wherein the at least one tapered waveguide is a tapered solid integrator rod.

28. A polarized light illumination apparatus as in claim 23, wherein the illumination apparatus is used in a television receiver.

29. A method for providing light illumination comprising the steps of:
coupling light from at least one light emitting diode (LED) to an optical waveguide;
collimating light from the at least one LED using the optical waveguide and presenting said collimated light to a nonpolarized dichroic combiner; and
combining light from the optical waveguide through the non-polarized dichroic combiner to produce a single light beam.

30. A method for providing light illumination as in claim 29, further comprising the step of;
positioning a lens at one end of the optical waveguide for converging light exiting the waveguide.

31. A method for providing light illumination as in claim 29, wherein the non-polarized dichroic combiner is a cross-type combiner or a V-type combiner.

32. A method for providing light illumination as in claim 29, further comprising the step of:
positioning at least one prism at one end of the waveguide for orienting the light from the optical waveguide to the non-polarized dichroic combiner.

33. A method for providing light illumination as in claim 29, wherein the at least one optical waveguide is a tapered hollow light pipe.

34. A method for providing fight illumination as to claim 29, wherein the at least one optical waveguide is a tapered solid integrator rod.

35. A method for providing light illumination as in claim 29, wherein the illuminated light is used in a television monitor.

* * * * *